: US 10,879,794 B2
(45) Date of Patent: Dec. 29, 2020

(54) DC-DC CONTROLLER WITH DCM CONTROL

(71) Applicant: uPI Semiconductor Corp., Hsinchu County (TW)

(72) Inventors: Chih-Lien Chang, Hsinchu County (TW); Min-Rui Lai, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 61 days.

(21) Appl. No.: 16/294,942

(22) Filed: Mar. 7, 2019

(65) Prior Publication Data

US 2019/0356220 A1 Nov. 21, 2019

(30) Foreign Application Priority Data

May 17, 2018 (CN) .......................... 2018 1 0471536

(51) Int. Cl.
*H02M 3/04* (2006.01)
*H02M 1/00* (2006.01)

(52) U.S. Cl.
CPC .............. *H02M 3/04* (2013.01); *H02M 1/00* (2013.01); *H02M 2001/0009* (2013.01); *H02M 2001/0025* (2013.01); *H02M 2001/0048* (2013.01)

(58) Field of Classification Search
CPC .. H02M 3/04; H02M 1/00; H02M 2001/0048; H02M 2001/0025; H02M 2001/0009
See application file for complete search history.

(56) References Cited

U.S. PATENT DOCUMENTS

| 7,652,945 | B2 | 1/2010 | Chu et al. | |
| 7,940,596 | B2 | 5/2011 | Chu et al. | |
| 8,541,993 | B2 | 9/2013 | Notman et al. | |
| 8,624,573 | B2 | 1/2014 | Yu et al. | |
| 8,786,267 | B2 | 7/2014 | Lu et al. | |
| 2007/0085520 | A1* | 4/2007 | Ho | H02M 3/1588 323/282 |
| 2011/0148377 | A1* | 6/2011 | Schiff | H02M 3/1588 323/283 |
| 2014/0307483 | A1* | 10/2014 | Sigamani | H02M 3/33546 363/21.02 |
| 2016/0336857 | A1* | 11/2016 | Liu | H02M 3/1588 |
| 2017/0257031 | A1* | 9/2017 | Shao | H02M 3/1582 |
| 2018/0123440 | A1* | 5/2018 | Lee | H02M 1/08 |
| 2019/0229634 | A1* | 7/2019 | Moon | H02M 7/217 |

* cited by examiner

*Primary Examiner* — Adolf D Berhane
*Assistant Examiner* — Kevin H Sprenger
(74) *Attorney, Agent, or Firm* — JCIPRNET

(57) ABSTRACT

A dc-dc controller is provided. The dc-dc controller includes a current sensing pin, a zero-current comparator, a comparison circuit and a threshold adjustment circuit. The current sensing pin is coupled to an output stage to receive a current sensing signal related to the output current. The zero-current comparator is coupled to the current sensing pin, and receives the current sensing signal and a first preset value to provide a zero-current signal. The comparison circuit is coupled to the zero-current comparator and the current sensing pin, and compares the current sensing signal with a second preset value to provide an adjustment signal. The threshold adjustment circuit is coupled to the comparison circuit and the zero-current comparator, and generates the first preset value according to the adjustment signal.

6 Claims, 3 Drawing Sheets

DC-DC CONTROLLER WITH DCM CONTROL

CROSS REFERENCE TO RELATED APPLICATION

This application claims the priority benefit of China application serial no. 201810471536.X, filed on May 17, 2018. The entirety of the above-mentioned patent application is hereby incorporated by reference herein and made a part of specification.

BACKGROUND OF THE INVENTION

1. Field of the Invention

The invention relates to a power conversion control technique, and more particularly, relates to a dc-dc controller.

2. Description of Related Art

FIG. 3 is a circuit block diagram of a dc-dc conversion circuit in conventional art. With reference to FIG. 3, a dc-dc conversion circuit 900 includes a dc-dc controller 940 and an output stage 920. The dc-dc controller 940 is configured to generate a pulse width modulation signal S_PWM for controlling the output stage 920 to generate an output voltage VPH and an output current ILO. In general, the dc-dc conversion circuit 900 at light loading will enter a discontinuous conduction mode (DCM) to improve its own power conversion efficiency.

In the discontinuous conduction mode, at the moment when the output current ILO of the output stage 920 drops to zero, the dc-dc controller 940 will output a pulse width modulation signal S_PWM in tri-state to the output stage 920. That is to say, the pulse width modulation signal S_PWM will have a dead time so that a high side switch and a low side switch in the output stage 920 are simultaneously in a turn off state during the dead time. However, a parasitic resistance or a parasitic capacitance may exist on circuits inside the output stage 920 or a transmission path between the dc-dc controller 940 and the output stage 920. The parasitic resistance or the parasitic capacitance will lead to a delay in the transmission of the pulse width modulation signal S_PWM, which makes the switches in the output stage 920 would not be switched to the turn off state while the output current ILO of the output stage 920 is zero-current. In other words, the switches in the output stage 920 will not switch to the turn off state only until the output current ILO of the output stage 920 is negative-current. Consequently, the output stage 920 will suffer a switching loss, thereby increasing the overall power consumption of the dc-dc conversion circuit 900.

SUMMARY OF THE INVENTION

Accordingly, the invention provides a dc-dc controller, which can effectively reduce the switching loss of the output stage of the dc-dc conversion circuit.

The dc-dc controller of the invention is coupled to an output stage and controls the output stage to provide an output current. The dc-dc controller includes a current sensing pin, a zero-current comparator, a comparison circuit and a threshold adjustment circuit. The current sensing pin is coupled to an output stage to receive a current sensing signal related to the output current. The zero-current comparator is coupled to the current sensing pin, and receives the current sensing signal and a first preset value to provide a zero-current signal. The comparison circuit is coupled to the zero-current comparator and the current sensing pin, and compares the current sensing signal with a second preset value to provide an adjustment signal. The threshold adjustment circuit is coupled to the comparison circuit and the zero-current comparator, and adjusts the first preset value according to the adjustment signal.

In an embodiment of the invention, when the dc-dc controller operates in a discontinuous conduction mode, the comparison circuit compares the current sensing signal with the second preset value in response to the zero-current signal to generate the adjustment signal.

In an embodiment of the invention, if a signal value of the current sensing signal is less than the second preset value, the comparison circuit generates the adjustment signal such that the threshold adjustment circuit increases the first preset value in response to the adjustment signal.

In an embodiment of the invention, the threshold adjustment circuit increases the first preset value periodically until the current sensing signal is greater than the second preset value.

In an embodiment of the invention, the zero-current signal is configured to enable the comparison circuit, and the comparison circuit compares the current sensing signal with the second preset value to generate the adjustment signal when the comparison circuit is enabled.

In an embodiment of the invention, the dc-dc controller further includes a pulse width modulation signal generation circuit, coupled between the zero-current comparator and the output stage, and configured to generate a pulse width modulation signal for controlling the output stage. The pulse width modulation signal generation circuit generates the pulse width modulation signal in tri-state according to the zero-current signal.

Based on the above, the dc-dc controller proposed by the invention may adjust the first preset value according to the sensing signal related to the output current of the output stage, so the output stage can be switched to the turn off state at the same time when the output current drops to zero to prevent the output current form becoming negative current. As a result, the purpose of zero current switching can be achieved, thereby reducing the switching loss of the output stage.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
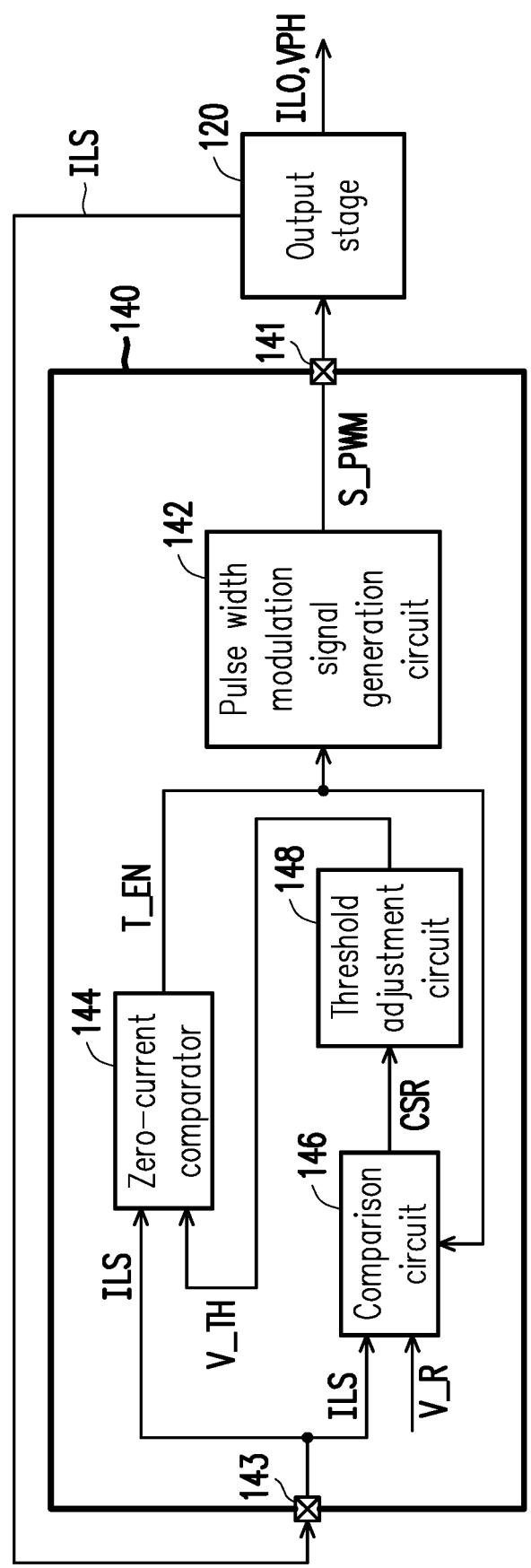
FIG. 1 illustrates a circuit block diagram of a dc-dc conversion circuit according to an embodiment of the invention.

Descriptions of the invention are given with reference to the exemplary embodiments illustrated with accompanied drawings, in which same or similar parts are denoted with same reference numerals. In addition, identical or similar reference numbers stand for identical or similar elements in the figures and the embodiments.

With reference to FIG. 1, FIG. 1 illustrates a circuit block diagram of a dc-dc conversion circuit 100 according to an embodiment of the invention. The dc-dc conversion circuit 100 may include a dc-dc controller 140 and an output stage 120. The dc-dc controller 140 is coupled to the output stage 120, and configured to control the output voltage 120 to generate and provide an output voltage VPH and an output current ILO.

The dc-dc controller 140 includes a pulse-width modulation output pin 141, a pulse width modulation signal generation circuit 142, a current sensing pin 143, a zero-current comparator 144, a comparison circuit 146 and a threshold adjustment circuit 148, but the invention is not limited thereto. The pulse-width modulation output pin 141 is coupled to the output stage 120. The pulse width modulation signal generation circuit 142 is coupled to the pulse width modulation output pin 141. The pulse width modulation signal generation circuit 142 is configured to generate a pulse width modulation signal S_PWM for controlling the output stage 120 to generate the output current ILO and the output voltage VPH. In an embodiment of the invention, the output stage 120 includes a high side switch and a low side switch (not illustrated) serially connected between an input voltage and a ground voltage. The high side switch and the low side switch are controlled by the pulse width modulation signal S_PWM, and a common contact between the high side switch and the low side switch serves as an output terminal of the output stage 120 for providing the output current ILO and the output voltage VPH. However, the invention is not limited in this regard.

The current sensing pin 143 is coupled to the output stage 120 to receive a current sensing signal ILS related to the output current ILO. The current sensing signal ILS is, for example, a sensing voltage or a sensing current corresponding to the output current ILO. The zero-current comparator 144 is coupled to the current sensing pin 143 and the pulse width modulation signal generation circuit 142 to receive the current sensing signal ILS and a first preset value V_TH, and configured to compare the current sensing signal ILS with the first preset value V_TH to generate and provide a zero-current signal T_EN. The first preset value V_TH is, for example, a preset voltage or a preset current. In an embodiment of the invention, when the zero-current signal T_EN is at logic high level, the pulse width modulation signal generation circuit 142 can generate the pulse width modulation signal S_PWM at logic high level or logic low level according to a feedback signal (not illustrated) related to the output voltage to turn on the high side switch or the low side switch in the output stage 120; and when the zero-current signal T_EN is at logic low level, the pulse width modulation signal generation circuit 142 generates the pulse width modulation signal S_PWM in tri-state, which makes the high side switch and the low side switch in the output stage 120 simultaneously in a turn off state, so the output voltage VPH can have a dead time.

The comparison circuit 146 is coupled to the current sensing pin 143, and configured to compare the current sensing signal ILS with a second preset value V_R to generate an adjustment signal CSR. The second preset value V_R is, for example, a reference voltage or a reference current. The threshold adjustment circuit 148 is coupled between the zero-current comparator 144 and the comparison circuit 146, and configured to generate the first preset value V_TH and determine whether to adjust the first preset value V_TH according to the adjustment signal CSR.

In an embodiment of the invention, the comparison circuit 146 is further coupled to the zero-current comparator 144 to receive the zero-current signal T_EN. In detail, the zero-current comparator 144 enables the comparison circuit 146 by the zero-current signal T_EN. The enabled comparison circuit 146 compares the current sensing signal ILS with the second preset value V_R to accordingly generate the adjustment signal CSR so the threshold adjustment circuit 148 can determine whether to adjust the first preset value V_TH according to the adjustment signal CSR.

In an embodiment of the invention, when a signal value (e.g., a voltage value) of the current sensing signal ILS is less than or equal to the first preset value V_TH (e.g., a voltage value), the zero-current comparator 144 generates, for example, the zero-current signal T_EN at logic low level to enable the comparison circuit 146. Conversely, when the signal value (e.g., the voltage value) of the current sensing signal ILS is greater than the first preset value V_TH (e.g., the voltage value), the zero-current comparator 144 generates, for example, the zero-current signal T_EN at logic high level to disable the comparison circuit 146.

In an embodiment of the invention, the zero-current comparator 144 and the comparison circuit 146 may be realized by adopting comparators, and the threshold adjustment circuit 148 may be realized by adopting an adjustable bandgap voltage circuit. However, the invention is not limited in this regard.

Figure 2:
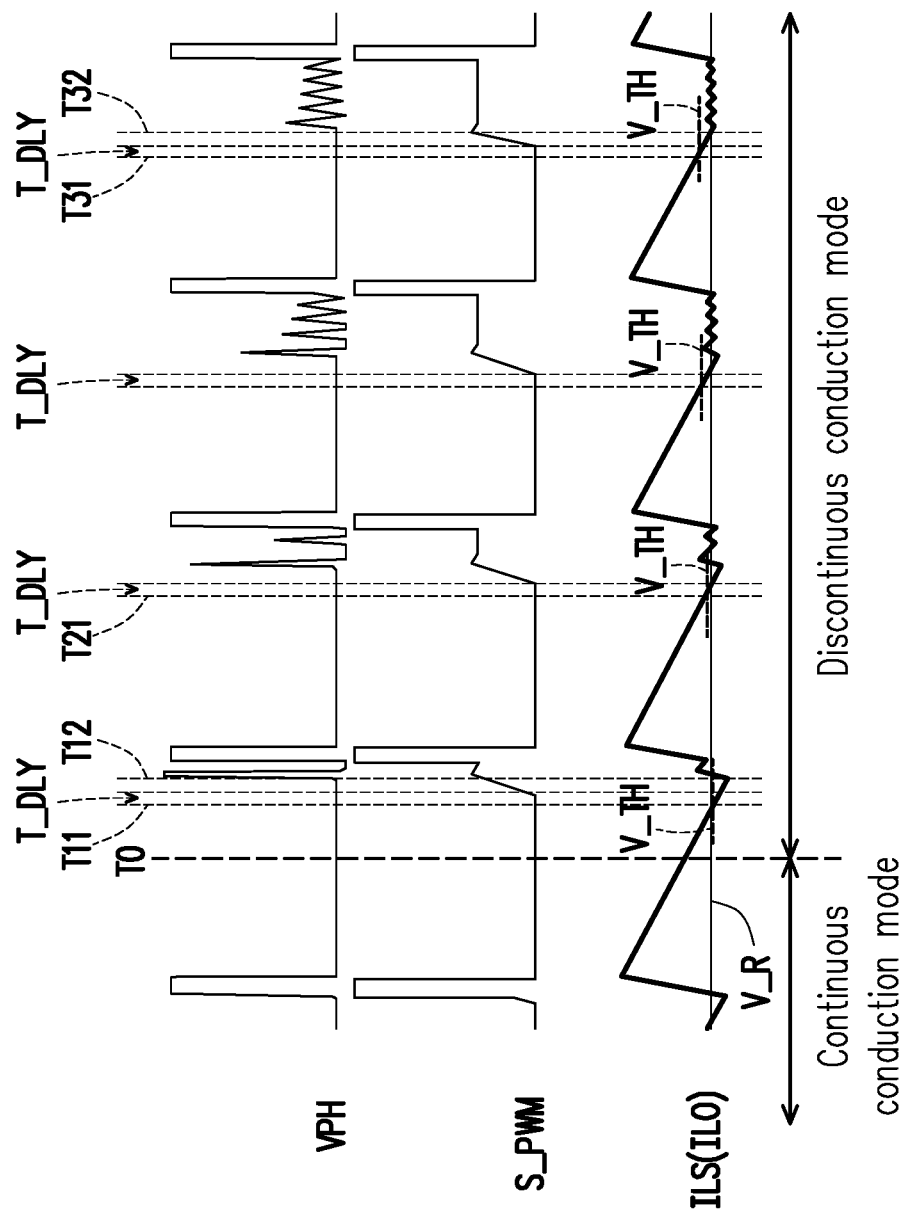
FIG. 2 illustrates a signal timing diagram of the dc-dc conversion circuit of FIG. 1 according to an embodiment of the invention.
Figure 3:
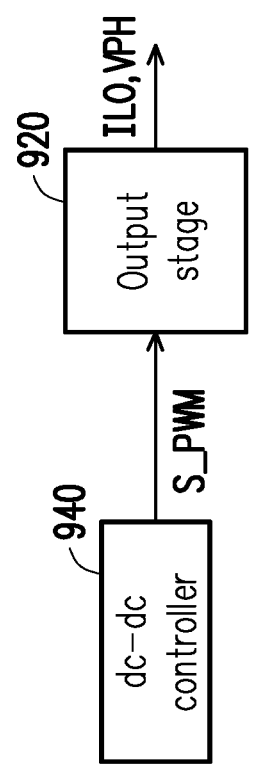
FIG. 3 is a circuit block diagram of a dc-dc conversion circuit in conventional art.

Operations of the dc-dc controller 140 will be described in more details below. Referring to FIG. 1 and FIG. 2 together, FIG. 2 illustrates a signal timing diagram of the dc-dc conversion circuit 100 of FIG. 1 according to an embodiment of the invention. First of all, before a time point T0, the dc-dc controller 140 operates in a continuous conduction mode (CCM). Operations in the continuous conduction mode are well-known to persons of ordinary skill in the art, and thus not repeated hereinafter.

Next, at the time point T0, due to a loading state being light loading or empty loading, the dc-dc controller 140 enters a discontinuous conduction mode (DCM) from the continuous conduction mode. Then, at a time point T11, because the output current ILO drops to zero, the zero-current comparator 144 determines that the signal value of the current sensing signal ILS is equal to the first preset value V_TH through comparison. Accordingly, the zero-current signal T_EN at logic low level is generated so the pulse width modulation signal generation circuit 142 can generate the pulse width modulation signal S_PWM in tri-state in response to the zero-current signal T_EN at logic low level and enable the comparison circuit 146 at the same time. However, since the pulse width modulation signal S_PWM has a time delay T_DLY during transmission to the output stage 120 (caused by a parasitic resistance and a parasitic capacitance on a transmission path between the dc-dc controller 140 and the output stage 120), both the high side switch and the low side switch in the output stage 120 can only enter the turn off state at a time point T12. Therefore, in a time interval between the time point T11 and the time point T12, the output current ILO will continue to drop and become negative current. In this case, the comparison circuit 146 can determine that the signal value of the current sensing signal ILS is less than the second preset value V_R through comparison, and generate the adjustment signal CRS to instruct the threshold adjustment circuit 148 to increase the first preset value V_TH.

Since the high side switch and the low side switch of the output stage 120 both enter the turn off state at the time point T12, the output current ILO will start to rise after the time point T12. When the signal value of the current sensing signal ILS is greater than the first preset value V_TH, the zero-current comparator 144 generates the zero-current signal T_EN at logic high level to make the pulse width modulation signal generation circuit 142 generate, according to the feedback signal, the pulse width modulation signal S_PWM for controlling the output stage 120 to generate the output voltage VPH and the output current ILO. Meanwhile, the zero-current signal T_EN at logic high level disables the comparison circuit 146.

Then, at a time point T21, the zero-current comparator 144 determines that the signal value of the current sensing signal ILS is equal to the increased first preset value V_TH through comparison, and thus generates the zero-current signal T_EN at logic low level to make the pulse width modulation signal generation circuit 142 generate the pulse width modulation signal S_PWM in tri-state and enable the comparison circuit 146 at the same time. The enabled comparison circuit 146 compares the signal value of the current sensing signal ILS with the second preset value V_R. At the time, because the signal value of the current sensing signal ILS is still less than the second preset value V_R, indicating that the output current ILO is negative current, the comparison circuit 146 generates the adjustment signal CRS to instruct the threshold adjustment circuit 148 to increase the first preset value V_TH again. The first preset value V_TH is successively increased until the output current ILO no longer drops to negative current.

At a time point T31, the zero-current comparator 144 determines that the signal value of the current sensing signal ILS is equal to the increased first preset value V_TH through comparison, and thus generates, for example, the zero-current signal T_EN at logic low level to make the pulse width modulation signal generation circuit 142 generate the pulse width modulation signal S_PWM in tri-state and enables the comparison circuit 146 at the same time. The comparison circuit 146 compares the signal value of the current sensing signal ILS with the second reset value V_R. Because the signal value of the current sensing signal ILS is not less than the second preset value V_R, indicating that the output current ILO is not negative current, the comparison circuit 146 generates the adjustment signal CSR that does not make the threshold adjustment circuit 148 adjust the first preset value V_TH.

In summary, the dc-dc controller proposed by the invention can adjust the first preset value according to the sensing signal related to the output current, so the high side switch and the low side switch of the output stage can switched to the turn off state at the same time when the output current drops to zero to prevent the output current form becoming negative current. As a result, the purpose of zero current switching can be achieved, thereby reducing the switching loss of the output stage.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dc-dc controller, coupled to an output stage and controlling the output stage to provide an output current, wherein the dc-dc controller comprises:
    a current sensing pin, coupled to the output stage, and receiving a current sensing signal related to the output current;
    a zero-current comparator, coupled to the current sensing pin, and receiving the current sensing signal and a first preset value to provide a zero-current signal;
    a comparison circuit, coupled to the zero-current comparator and the current sensing pin, wherein when the current sensing signal is equal to or less than the first preset value, the zero-current signal enables the comparison circuit to compare the current sensing signal with a second preset value according to the zero-current signal to provide an adjustment signal; and
    a threshold adjustment circuit, coupled to the comparison circuit and the zero-current comparator, and adjusting the first preset value according to the adjustment signal.

2. The dc-dc controller according to claim 1, wherein when the dc-dc controller operates in a discontinuous conduction mode, the comparison circuit compares the current sensing signal with the second preset value in response to the zero-current signal to generate the adjustment signal.

3. The dc-dc controller according to claim 1, wherein if the current sensing signal is less than the second preset value, the comparison circuit generates the adjustment signal such that the threshold adjustment circuit increases the first preset value in response to the adjustment signal.

4. The dc-dc controller according to claim 1, wherein the threshold adjustment circuit increases the first preset value periodically until the current sensing signal is greater than the second preset value.

5. The dc-dc controller according to claim 1, wherein the zero-current signal is configured to enable the comparison circuit, and the comparison circuit compares the current sensing signal with the second preset value to generate the adjustment signal when the comparison circuit is enabled.

6. The dc-dc controller according to claim 1, further comprising:
    a pulse width modulation signal generation circuit, coupled between the zero-current comparator and the output stage, and configured to generate a pulse width modulation signal for controlling the output stage,
    wherein the pulse width modulation signal generation circuit generates the pulse width modulation signal in tri-state according to the zero-current signal.

* * * * *